July 9, 1968  L. O'NEAL  3,391,502
DOCK SEAL
Filed July 22, 1966  2 Sheets-Sheet 1
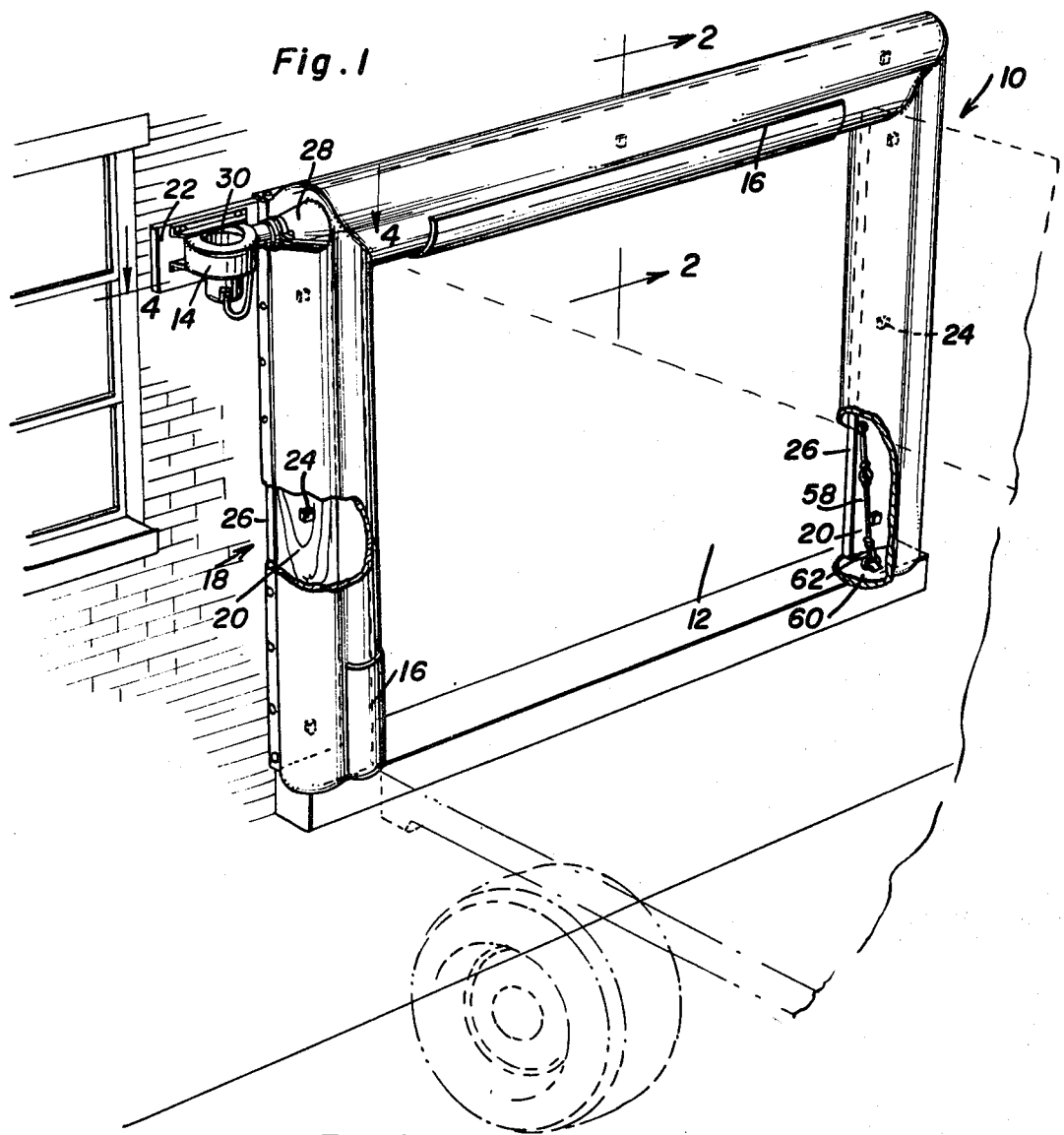
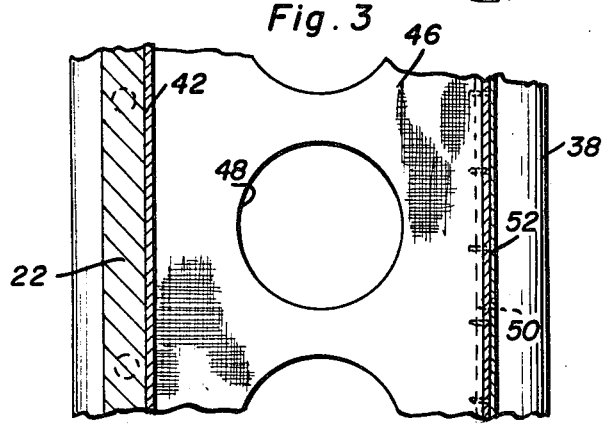
Larry O'Neal
INVENTOR.

July 9, 1968
L. O'NEAL
3,391,502
DOCK SEAL
Filed July 22, 1966
2 Sheets-Sheet 2
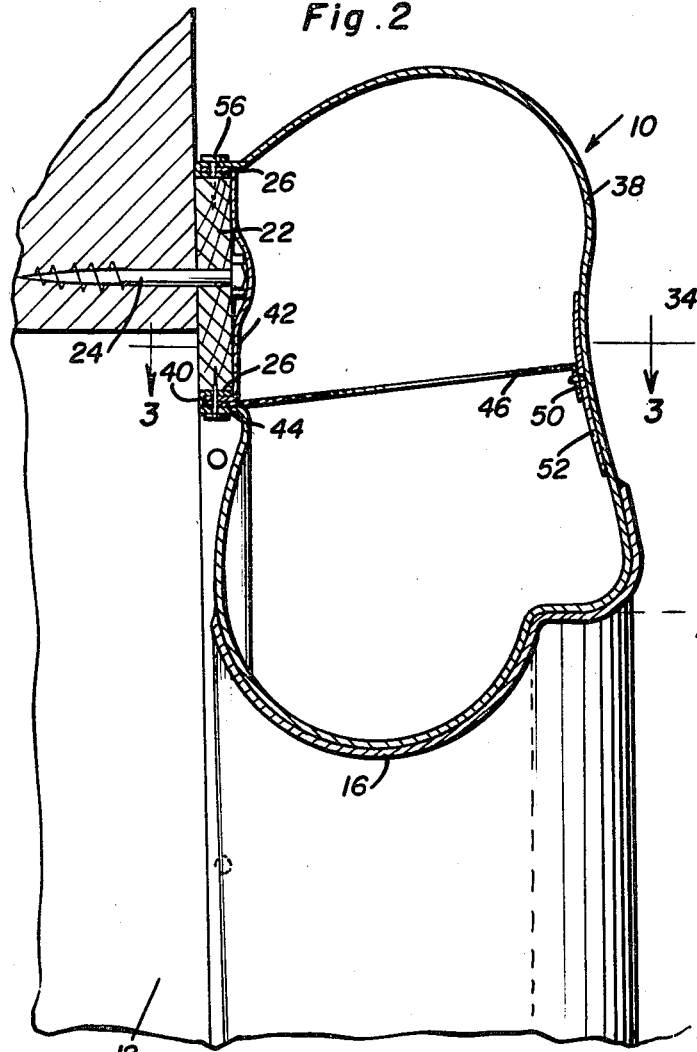
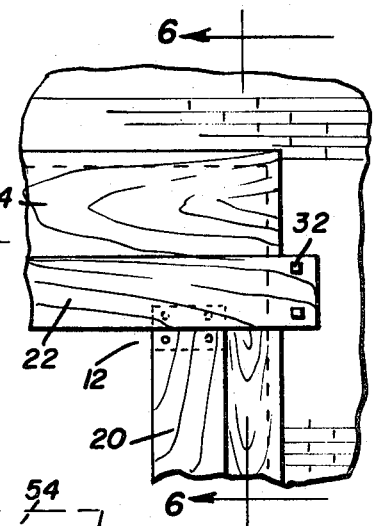
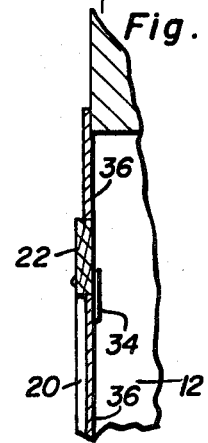
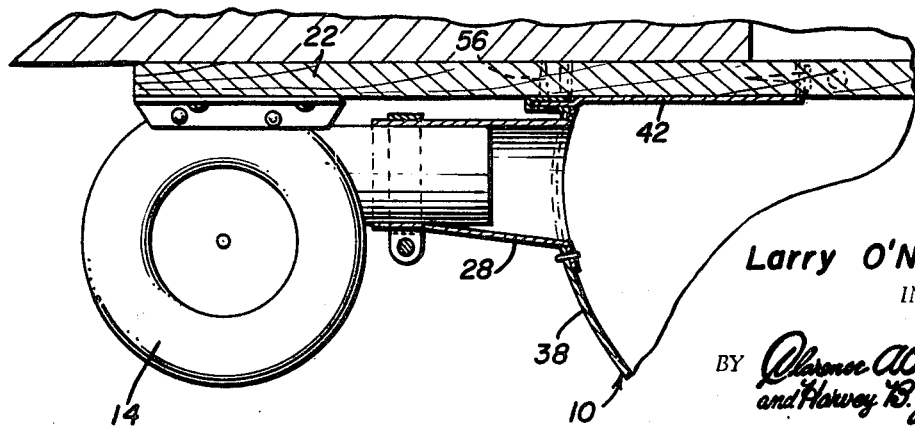
Larry O'Neal
INVENTOR.

United States Patent Office 3,391,502
Patented July 9, 1968

3,391,502
DOCK SEAL
Larry O'Neal, 549 W. Indianola Ave.,
Youngstown, Ohio 44511
Continuation-in-part of application Ser. No. 432,359,
Feb. 12, 1965. This application July 22, 1966, Ser.
No. 567,103
12 Claims. (Cl. 52—2)

ABSTRACT OF THE DISCLOSURE

An elongated inflatable member mounted on a building wall along two sides and the top of a loading opening therein for selective inflation and expansion into sealed engagement with an adjacent vehicle. The inflatable member includes internal means for effecting a lateral expansion of the tubular member across the adjacent edges of the opening.

---

This is a continuation-in-part of application Ser. No. 432,359, filed Feb. 12, 1965, for Air Lock Dock Seal, now Pat. No. 3,303,615. The present invention is concerned with unique and useful improvements in inflatable dock seals or covers utilized in providing a substantially airtight enclosure between a building opening, as for example, a warehouse loading door, and a vehicle positioned adjacent thereto for a loading or unloading of the fehicle.

It is a primary object of the instant invention to provide a loading dock seal which, in providing for a substantially complete closure of the space between the loading door and the vehicle, effectively seals out drafts, dirt and fumes, while enabling a maintaining of interior temperature and pressure controls.

Another highly significant object of the instant invention is to provide a seal or cover which is capable of adapting itself to a vehicle positioned relative to the opening either prior to or subsequent to the inflation of the cover.

In conjunction with the above object, it is a significant object of the instant invention to provide a seal which, through the constant introduction of air under a relatively low pressure, is resilient in nature and capable of accommodating a truck or the like moving into contact therewith.

Also, it is an important object of the instant invention to provide a dock seal which is mountable completely upon the exterior of a building in surrounding relation, along at least three sides, to a building opening with the construction of the seal itself resulting in the projection of a substantial portion of the seal inwardly of the edges of the opening for contact with the vehicle.

In addition, it is an object of the instant invention to provide an inflatable dock seal or cover which, during periods of non-use, is capable of collapsing compactly against the building, which is constructed of a relatively tough flexible material, and which, through the provision of a constant source of air under pressure in the form of a small blower, is capable of maintaining its inflated condition even through sustaining small punctures or tears.

Furthermore, it is an object of the instant invention to provide a mounting frame for the dock cover which enables a proper orientation of the cover on the face of a building, relative to the loading opening therein, so as to provide for a positive engagement with the sides and top of predetermined size vehicles.

Basically, in achieving the above objects, it is contemplated that the dock cover or seal of the invention be in the nature of an elongated continuous inflatable tubular member extending along the two opposed sides and across the top of a loading opening within a building. The tubular member is to include a full length longitudinally extending bulkhead which in effect deforms the tubular member so as to cause a lateral bulging thereof inwardly of the opening for engagement against a vehicle positioned, or to be positioned, therewithin. The lateral bulging of the tubular member or cover is significant in that it provides for the inward projection of a substantial portion of the member while still enabling a securing of the member solely to the exterior of the building.

These together with other objects and advantages which will become subsquently apparent reside in the details of construction and operation as more fully hereinafter described and claimed, reference being had to the accompanying drawings forming a part hereof, wherein like numerals refer to like parts throughout, and in which:

FIGURE 1 is a perspective view of the dock seal cover of the instant invention in its mounted and inflated position upon a building in surrounding relation to a loading opening therein;

FIGURE 2 is an enlarged transverse cross-sectional view taken substantially on a plane passing along line 2—2 in FIGURE 1;

FIGURE 3 is a partial cross-sectional view taken substantially on the plane passing along line 3—3 in FIGURE 2;

FIGURE 4 is an enlarged partial cross-sectional view taken substantially on a plane passing along line 4—4 in FIGURE 1;

FIGURE 5 is a partial elevational view illustrating the preferred manner of modifying a building opening so as to accommodate a cover mounting frame which is to be substantially smaller than the opening itself; and FIGURE 6 is a partial cross-sectional view taken substantially on a plane passing along line 6—6 of FIGURE 5.

Referring now more specifically to the drawings, reference numeral 10 is used to generally designate the dock cover or seal comprising the instant invention. This seal 10 is to be provided in surrounding relation to a building opening 12, such as a warehouse loading dock or the like.

The seal 10, which is in the nature of an elongated inflatable substantially tubular member positionable along the opposed vertical sides of the opening 12 and across the top thereof, is to preferably be constructed of neoprene coated nylon. Such material will provide the necessary resistance to tears or rips and be capable of accommodating repeated engagement thereagainst by both the vehicles coming in contact therewith and the various freight which might brush or engage thereagainst during the loading and unloading procedures. The cover 10 is to be inflated by means of a relatively small blower 14 capable of introducing a constant flow of low pressure air during periods of use. The utilization of the constant flow of low pressure is of significance in that the cover 10 itself will be capable of easily flexing so as to provide a soft surface for engagement by the vehicle to be loaded or unloaded, the air itself being forced back through the blower 14 upon a compression of the cover 10. By the same token, it will be recognized that the ability of the inflated cover 10 to give under pressure also assists in providing for a tight seal between the building and the adjacent vehicle.

With reference to FIGURE 1 in particular, it will be noted that additional plies of material 16 can be applied, as by gluing, to those portions of the cover 10 which are to be subjected to the greatest wear, this being the lower portions of the vertical sides of the cover and along a major portion of the overhead horizontal section.

In order to mount the cover or dock seal 10, a mounting frame 18 is provided. This mounting frame consists of a pair of vertical planks or framing members 20 and a horizontal plank or framing member 22 suitably affixed, as by anchoring bolts 24, to the opposed sides and across the top of the opening 12. These planks 20 are to preferably be 2 x 10 positioned flat against the exterior of the building so as to present opposed longitudinal edges 26 to which the cover 10 is to be fastened as shall be described presently. With reference to FIGURES 1 and 4, it will be noted that the horizontal top plank 22 is to project laterally of one of the vertical planks 20 so as to constitute a mounting platform for the blower 14 which is in turn directly communicated with the interior of the cover 10 through a sleeve 28 engaged about the discharge end of the blower 14, the intake 30 of which is upwardly directed.

The frame 18 is to be oriented relative to the building opening 12 so as to position the cover 10 for engagement with the sides and top of the vehicle to be introduced thereagainst. Accordingly, it will be appreciated that the framing members 20 and 22 may have to be positioned directly at the sides of the opening 12 as illustrated in FIGURES 1, 2 and 4, outwardly of the sides of the opening 12, or inwardly of the sides of the opening. FIGURES 5 and 6 are of significance in illustrating one manner of modifying the opening 12 for the accommodation of a smaller frame which in effect reduces the sides of the opening. This is accomplished by completely spanning the opening with the horizontal plank or framing member 22, the opposite ends of which are bolted, as at 32, to the building wall. Next, the vertical members 20 are vertically positioned inward of the vertical sides of the opening and bolted to a connector plate 34 which is in turn bolted to and depends from the horizontal member 22. The lower ends of the vertical members 20 are in turn affixed, as for example through an angle plate (not illustrated), to the dock floor. Finally, the openings surrounding the frame 12 are to be closed by suitable plywood paneling 36 or the like.

The cover 10 itself is formed by a full length arcuate or substantially circular panel 38, the opposite longitudinal edge portions 40 of which are interconnected by a full length relatively narrow flat mounting panel 42. The opposite edges 44 of the mounting panel 42, which is of equal length with the main panel 38, are laterally directed so as to overlie the opposite edges 26 of the frame planks 20 and 22 with the edge portions 40 of the panel 38 being reentrant in shape and receiving and enclosing the laterally directed edge portions or edge flanges 44 of the panel 42. The reentrant edge portions 40 of the panel 38 and the corresponding received edge portions 44 of the panel 42 are then permanently stitched together and nailed to the corresponding plank edges 26 so as to affix the cover 10 to the mounting frame 18.

The cover 10, formed in this manner, will project outwardly from the face of the building. However, it is also desirable that a substantial portion of the cover 10, along the full length thereof, project inwardly across the truck receiving opening 12 to insure a proper sealing engagement with the truck, and to also accommodate slight differences between trucks of the same general size. This is effected by the provision of a bulkhead or shape defining retaining panel 46 which extends the full length of the cover 10 and is engaged transversely thereacross in a maner so as to draw the central portion of the panel 38 inwardly toward the mounting panel 42, this in turn causing a lateral bulging or deformation of the panel 38 inwardly across the opening 12. The retaining panel 46, provided with a series of air passing apertures 48 along the full length thereof, has one longitudinal edge 50 thereof stitched to a mounting strip 52 which is in turn glued to the main arcuate panel 38 of the cover 10 longitudinally along the interior thereof at a point generally diametrically opposed from the mounting panel 42. The other end of the retaining panel 46 is received within the stitched joint between the panel edge portion 40 and the panel edge portion 44 which define the mounting flap overlying the inner plank edge 26. The utilization of a strip 52 for securing the retaining panel 46 is of significance in that, the strip 52 can be glued to the interior surface of the panel 38, there is no necessity of piercing the panel 38 by stitching or the like. As will be appreciated from FIGURE 2, the retaining panel 46 is of a width substantially less than the diameter of the cover 10 so as to cause a lateral bulging of the panel into a generally oblong configuration with the retaining panel 46 being oriented so as to position a major portion of the bulge inwardly toward the truck receiving opening 12. With reference to this inward bulging of the cover 10, FIGURE 2 is of interest in illustrating, in phantom lines, the rear end of a truck body 54 engaged thereagainst and causing an inward flexing of the cover 10 in a manner which produces a positive seal with the truck body 54.

With reference to FIGURE 4, it will be noted that the mounting flap, defined by the sewn panel edge portions 40 and 44, where it passes over the top or horizntal plank 22, is secured directly to the face thereof by the appropriate driven fasteners 56. With reference to FIGURE 1, it will be noted that an elongated elastic suspension cord or cable 58 has been provided, such a cable being introduced in each of the vertical portions of the cover 10, so as to prevent an excessive sagging of the corresponding bottom panel 60 which completes the cover 10. This problem of a sagging of the lower ends of the vertical portions of the cover or seal 10 arises when the cover 10 is deflated or collapsed during periods of nonuse. The cable or cord 58 has its lower end thereof engaged with the corresponding bottom panel 60 by means of a suitable ring 62 or the like which is in turn affixed to the interior of the bottom panel 60 in any suitable manner. The upper end of the cable 58 is to be secured to the back or mounting panel 42 in upwardly spaced relation to the bottom panel 60. The elastic or resilient nature of the cord is to be such as to cause a slight raising of the corresponding bottom panel 60 and the lower end of the vertical portion of the cover defining tubular member.

While not specifically mentioned, it should be appreciated that the cover or seal 10 can be extended horizontally below the opening 12 if so desired. However, this will not normally be necessary in that a conventional loading apron is frequently provided from the building to the truck bed for the movement of the loads thereacross.

From the foregoing, it should be appreciated that a highly novel dock cover or seal has been defined. This seal, inflatable in nature, is of such construction as to enable it to be mounted upon the fact of a building in surrounding relation to a loading opening with a substantial portion of the seal projecting laterally inward across the corresponding edges of the opening so as to provide an inwardly directed sealing cushion for engagement with the vehicle to be loaded or unloaded. This provision of an inwardly projecting seal is effected without necessitating a mounting of the seal, or any portion thereof, either within the opening itself or within the building through the provision of means for laterally expanding the seal beyond the innermost mounting flap which is secured to the mounting frame extending about that portion of the periphery of the opening to which the seal is to be conformed. This in turn is effected as detailed supra, by a full length transversely orientated retaining panel of a width less than the diameter of the cover.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A wall having an opening defined through one face thereof, an elongated inflatable dock cover extending about a major portion of the border of said opening, said cover comprising an elongated hollow generally tubular member, means engaging a full length section of said member with said wall adjacent said opening, said member, along the full length thereof, projecting laterally toward and across a portion of said opening beyond said means, an elongated panel positioned within said member and orientated transversely thereacross in a plane extending outward from said one wall face, said panel having a transverse width less than that of the inflated member in said plane, and means securing the opposite longitudinal edges of said panel to opposed portions of said member in said plane whereby an inward bowing of said member toward said wall face is effected along with the aforementioned lateral projection of said member toward said opening.

2. The structure of claim 1 wherein the means mounting said cover of said one face comprises a frame secured to said one face along the length of said dock cover, said frame defining inner and outer side edges, relative to the opening, lying in generally parallel planes extending outwardly from said one face, said dock cover including a pair of spaced rearwardly extending mounting flaps overlying said side edges, and means securing said flaps to said side edges.

3. The structure of claim 2 wherein one of the opposed portions of said member to which a longitudinal edge of the panel is secured is located at the inner of said side edges adjacent said opening.

4. The structure of claim 1 including means for introducing air under pressure into said tubular member, said panel having a series of air flow permitting apertures defined therein at selected points along the length thereof.

5. The structure of claim 1 wherein the laterally bulging portion of said member between said panel and the opening constitutes the major portion of said member.

6. For engagement with a wall about an opening defined therein, an inflatable seal, said seal comprising an elongated hollow generally tubular member, an elongated panel positioned longitudinally within said tubular member, said panel being orientated transversely across said tubular member, means securing the opposite longitudinal edges of said panel to opposed portions of said tubular member, said panel having a transverse width less than the width of the inflated member in the plane of said panel whereby an inward bowing of said member along the longitudinal edges of said panel is effected, along with a corresponding lateral bulging of said member.

7. The structure of claim 6 wherein said seal includes a pair of laterally directed substantially full length mounting flaps, one of said opposed portions of said member to which a longitudinal edge of said panel is secured being located approximately at the juncture of one of said flaps and said member.

8. The structure of claim 7 wherein said member includes end panels, and an elongated elastic cord positioned within said member adjacent each of the end panels, each of the elastic cords having one end thereof secured to the interior of one end panel and the second end thereof secured in spaced relation to the end panel to the interior surface of the member for resiliently limiting the movement of the end portion of the member.

9. The structure of claim 7 including means for selectively introducing a constant supply of low pressure air into said member, said panel having a plurality of air flow permitting apertures defined therein along the length thereof.

10. The structure of claim 2 including means for introducing air under pressure into said hollow member, said panel being permeable to air to allow a movement of the introduced air therethrough.

11. The structure of claim 6 wherein said seal includes integral laterally directed mounting flap means thereon.

12. The structure of claim 6 including elastic means internally within said member limiting the movement thereof.

References Cited

UNITED STATES PATENTS

| | | | |
|---|---|---|---|
| 511,472 | 12/1893 | Sumovski | 52—2 |
| 1,620,933 | 3/1927 | Wilcox | 52—173 |
| 2,935,771 | 5/1960 | Hatcher | 49—498 |
| 2,939,467 | 6/1960 | Meyer et al. | 52—2 |
| 3,175,519 | 3/1965 | Warheit | 49—498 |

REINALDO P. MACHADO, *Primary Examiner.*